US012700383B2

(12) United States Patent
Hur et al.

(10) Patent No.:  US 12,700,383 B2
(45) Date of Patent:      Aug. 4, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jaemyung Hur, Suwon-si (KR); Minsup Kim, Suwon-si (KR); Hojune Yoo, Suwon-si (KR); Kyoungshin Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 18/596,306

(22) Filed: Mar. 5, 2024

(65) Prior Publication Data

US 2024/0212649 A1      Jun. 27, 2024

Related U.S. Application Data

(63) Continuation of application No. PCT/KR2022/012731, filed on Aug. 25, 2022.

(30) Foreign Application Priority Data

Sep. 6, 2021    (KR) ........................ 10-2021-0118207

(51) Int. Cl.
*G09G 5/10*         (2006.01)
*G06F 3/01*         (2006.01)
(Continued)

(52) U.S. Cl.
CPC .............. *G09G 5/10* (2013.01); *G06F 3/011* (2013.01); *G06F 3/16* (2013.01); *G06T 7/50* (2017.01);
(Continued)

(58) Field of Classification Search
CPC ............. G09G 5/10; G09G 2320/0626; G09G 2340/0407; G06F 3/011; G06F 3/16;
(Continued)

(56) References Cited

U.S. PATENT DOCUMENTS 6,563,479 B2    5/2003  Weindorf et al.
9,766,849 B2    9/2017  Kim et al.
(Continued)

FOREIGN PATENT DOCUMENTS

JP        2010177777 A  *  8/2010
KR        10-1371243 B1     3/2014
(Continued)

OTHER PUBLICATIONS

Communication issued Oct. 16, 2024 by the European Patent Office in European Patent Application No. 22864959.6.
(Continued)

*Primary Examiner* — Sarah Lhymn
(74) *Attorney, Agent, or Firm* — Sughrue Mion, PLLC

(57) ABSTRACT

An electronic apparatus including: a display; a sensor; a memory; and a processor configured to: obtain first distance information regarding a distance between a user of the electronic apparatus and the electronic apparatus through the sensor; identify a space in which the user is located from among a plurality of spaces predefined according to a distance from the electronic apparatus based on the first distance information; and control at least one of a resolution or a brightness of content displayed through the display based on control information corresponding to the identified space from among predetermined control information for each of the plurality of spaces.

16 Claims, 7 Drawing Sheets

100

(51) Int. Cl.

| | |
|---|---|
| *G06F 3/16* | (2006.01) |
| *G06T 7/50* | (2017.01) |
| *G06T 7/60* | (2017.01) |
| *G06V 20/52* | (2022.01) |
| *H04B 17/27* | (2015.01) |

(52) U.S. Cl.
CPC ................ *G06T 7/60* (2013.01); *G06V 20/52* (2022.01); *H04B 17/27* (2015.01); *G09G 2320/0626* (2013.01); *G09G 2330/023* (2013.01); *G09G 2340/0407* (2013.01); *G09G 2354/00* (2013.01)

(58) Field of Classification Search
CPC ....... G06F 3/0346; G06F 1/3231; G06T 7/50; G06V 20/52; H04B 17/27; G01S 5/0269; G01S 11/14; G01S 2205/09; G01S 3/8086; H04N 21/4436; H04N 21/4223; H04N 21/44218; H04R 3/005; H04R 29/00; H04S 7/302
See application file for complete search history.

(56) References Cited

U.S. PATENT DOCUMENTS

| | | | |
|---|---|---|---|
| 9,892,689 | B2 | 2/2018 | Kang et al. |
| 10,021,378 | B2 | 7/2018 | Kim |
| 10,026,381 | B2 | 7/2018 | Li et al. |
| 10,310,582 | B2 | 6/2019 | Park et al. |
| 10,408,928 | B2 | 9/2019 | Park et al. |
| 10,429,945 | B2 | 10/2019 | Lee et al. |
| 10,670,691 | B2 | 6/2020 | Ogura |
| 10,712,804 | B2 | 7/2020 | Singh et al. |
| 10,893,325 | B2 | 1/2021 | Cheong et al. |
| 2010/0295839 | A1 | 11/2010 | Nagaya et al. |
| 2013/0094666 | A1* | 4/2013 | Haff ................. H04N 21/42222 345/428 |
| 2014/0244429 | A1* | 8/2014 | Clayton ............. G06Q 30/0631 705/26.7 |
| 2016/0205391 | A1* | 7/2016 | Kim ..................... H04N 13/366 348/51 |
| 2018/0150147 | A1* | 5/2018 | Fujimaki ................. G06F 3/038 |
| 2018/0164981 | A1 | 6/2018 | Park et al. |
| 2018/0184618 | A1* | 7/2018 | Gotts ................... A01K 15/023 |
| 2018/0204436 | A1* | 7/2018 | Miyajima ............. G08B 21/02 |
| 2019/0237078 | A1* | 8/2019 | Park ..................... H04N 9/3179 |
| 2019/0246172 | A1 | 8/2019 | Cheong et al. |
| 2019/0293446 | A1* | 9/2019 | Cho ................. G01C 21/3664 |
| 2020/0099545 | A1* | 3/2020 | Hong ...................... H04L 67/55 |
| 2020/0342144 | A1* | 10/2020 | Alameh ................ G06F 3/0482 |
| 2020/0410072 | A1 | 12/2020 | Giusti et al. |
| 2021/0132769 | A1 | 5/2021 | Parikh et al. |
| 2021/0208669 | A1 | 7/2021 | Wang |

FOREIGN PATENT DOCUMENTS

| | | | | | |
|---|---|---|---|---|---|
| KR | 10-2015-0020912 | A | 2/2015 | | |
| KR | 10-2015-0036931 | A | 4/2015 | | |
| KR | 10-2016-0020088 | A | 2/2016 | | |
| KR | 10-2017-0044419 | A | 4/2017 | | |
| KR | 10-2017-0052522 | A | 5/2017 | | |
| KR | 10-2017-0082029 | A | 7/2017 | | |
| KR | 10-2018-0024617 | A | 3/2018 | | |
| KR | 10-2018-0050052 | A | 5/2018 | | |
| KR | 10-2018-0076154 | A | 7/2018 | | |
| KR | 10-2037351 | B1 | 10/2019 | | |
| KR | 102157224 | B1 * | 9/2020 | ......... | H04N 21/4402 |
| WO | 2017/119646 | A2 | 7/2017 | | |
| WO | 2018/084482 | A2 | 5/2018 | | |

OTHER PUBLICATIONS

International Search Report and Written Opinion (PCT/ISA/210 and PCT/ISA/237) dated Dec. 13, 2022, issued by International Searching Authority for International Application No. PCT/KR2022/012731.

Communication issued on Jan. 27, 2026 by the Korean Ministry of Intellectual Property (MOIP) in Korean Patent Application No. 10-2021-0118207.

\* cited by examiner

| TYPE OF INFORMATION | DETECTION RESULT | | | |
|---|---|---|---|---|
| DISTANCE | 0~5m | NOT DETECTED | NOT DETECTED | NOT DETECTED |
| SIGNAL INTENSITY | - | EQUAL TO OR GREATER THAN -70dBm | EQUAL TO OR GREATER THAN -60dBm AND LESS THAN -70dBm | LESS THAN -60dBm |
| USER VOICE | - | 40dB | 10dB | NOT DETECTED |
| SPACE IDENTIFICATION RESULT | ADJACENT SPACE | SAME SPACE | ANOTHER SPACE IN HOUSE | OUTER SPACE |

FIG. 5

|  | 0~30 MINUTES | 30 MINUTES~ 1 HOUR | MORE THAN 1 HOUR | MORE THAN 2 HOURS |
|---|---|---|---|---|
| ANOTHER SPACE IN HOUSE | RESOLUTION 720 BRIGHTNESS 80% | RESOLUTION 480P BRIGHTNESS 50% | RESOLUTION 320P BRIGHTNESS 30% | RESOLUTION 320P BRIGHTNESS 20% |
| OUTER SPACE | RESOLUTION 480P BRIGHTNESS 50% | RESOLUTION 320P BRIGHTNESS 40% | RESOLUTION 320P BRIGHTNESS 20% | OFF |

ELECTRONIC APPARATUS AND CONTROLLING METHOD THEREOF

CROSS-REFERENCE TO RELATED APPLICATIONS

This application is a by-pass continuation application of International Application No. PCT/KR2022/012731, filed on Aug. 25, 2022, which based on and claims priority to Korean Patent Application No. 10-2021-0118207, filed on Sep. 6, 2021, in the Korean Intellectual Property Office, the disclosures of which are incorporated by reference herein in their entireties.

BACKGROUND

1. Field

The disclosure relates to an electronic apparatus and a controlling method thereof and more particularly, to an electronic apparatus capable of controlling a display based on information regarding a distance between a user and the electronic apparatus.

2. Description of Related Art

With the development of technology, the functions that can be performed by an electronic apparatus are becoming more diverse, and the time a user spends using an electronic apparatus and the amount of power consumed by the electronic apparatus are also increasing. Accordingly, various technologies for reducing power consumption of an electronic apparatus are continuously being developed, but there is a problem that the technologies developed to date do not sufficiently reflect the user's usage environment or behavior.

For example, according to the prior art, when there is no user input attempt for a predetermined time, it is attempted to save power consumption by entering a power save mode. However, in this case, even if the user is actually in front of the screen, the screen may enter the power save mode simply because there is no input attempt from the user, thereby causing inconvenience to the user.

Accordingly, there is a need for a technology to reduce power consumption of an electronic apparatus in a way suitable for the user's actual usage environment by considering information regarding the user such as a distance between the user and the electronic apparatus, the user's location or the user's behavior.

SUMMARY

Provided are an electronic apparatus capable of controlling at least one of resolution or brightness of content displayed through a display based on information regarding a distance between the user and the electronic apparatus and a controlling method thereof.

According to an aspect of the disclosure, an electronic apparatus including a display; a sensor; a memory; and a processor configured to: obtain first distance information regarding a distance between a user of the electronic apparatus and the electronic apparatus through the sensor; identify a space in which the user is located from among a plurality of spaces predefined according to a distance from the electronic apparatus based on the first distance information; and control at least one of a resolution or a brightness of content displayed through the display based on control information corresponding to the identified space from among predetermined control information for each of the plurality of spaces.

The electronic apparatus may include a communication circuit, wherein the processor is further configured to: receive a first signal from a user terminal of the user connected to the electronic apparatus through the communication circuit; obtain second distance information regarding a distance between the user and the electronic apparatus based on a strength of the received first signal; or identify the space in which the user is located from among the plurality of spaces based on the first distance information and the second distance information.

The electronic apparatus may include a microphone, wherein the processor is further configured to: receive a user voice of the user through the microphone; obtain third distance information regarding a distance between the user and the electronic apparatus based on a size of the received user voice; or identify the space in which the user is located from among the plurality of spaces based on the first distance information, the second distance information and the third distance information.

The electronic apparatus may include a camera, wherein the processor is further configured to: obtain an image regarding a front of the electronic apparatus through the camera; obtain fourth distance information regarding a distance between the user and the electronic apparatus based on whether an object corresponding to the user is included in the obtained image and a size of the object corresponding to the user; or identify the space in which the user is located from among a plurality of spaces based on the first distance information, the second distance information, the third distance information, and the fourth distance information.

The electronic apparatus may include the sensor including an illuminance sensor, and wherein the processor is further configured to: obtain illuminance information regarding a surrounding of the electronic apparatus through the illuminance sensor; obtain fifth distance information regarding a distance between the user and the electronic apparatus based on the illuminance information; and identify the space in which the user is located from among the plurality of spaces based on the first distance information, the second distance information, the third distance information, the fourth distance information, and the fifth distance information.

The electronic apparatus may include the processor further configured to receive information regarding a strength of a second signal transmitted by the user terminal from each of a plurality of external devices connected to the electronic apparatus through the communication circuit; or identify the space in which the user is located from among the plurality of spaces based on the information regarding the strength of the first signal and the information regarding the strength of the second signal received from each of the plurality of external devices.

The electronic apparatus may include the control information including information regarding the resolution of the content and information regarding the brightness of the content, or wherein the information regarding the resolution of the content is based on information regarding an optimal viewing distance according to a size and a resolution of the display.

The electronic apparatus may include the processor is configured to: receive operation information regarding a movement of the user from a remote control device for controlling a user terminal or the electronic apparatus through a communication circuit; and control at least one of the resolution or the brightness of the content based on control information corresponding to the identified space or the operation information.

The electronic apparatus may include the plurality of spaces are defined based on information regarding a location of the user received for a predetermined time period or more from a user terminal of the user.

The electronic apparatus may include the processor is configured to, based on identifying that the space in which the user is located is maintained in the identified space for a predetermined time period, control the display to change the at least one of the resolution or the brightness of content displayed through the display.

According to an aspect of the disclosure, a method controlling of an electronic apparatus, the method including obtaining distance information regarding a distance between a user of the electronic apparatus and the electronic apparatus; identifying a space in which the user is located from among a plurality of spaces predefined according to a distance from the electronic apparatus based on the distance information; or controlling at least one of a resolution or a brightness of content displayed through a display of the electronic apparatus based on control information corresponding to the identified space from among predetermined control information for each of the plurality of spaces.

The method may include obtaining first distance information regarding a distance between the user of the electronic apparatus and the electronic apparatus through a sensor of the electronic apparatus; receiving a first signal from a user terminal of the user connected to the electronic apparatus; or obtaining second distance information regarding a distance between the user and the electronic apparatus based on a strength of the received first signal, wherein the identifying the space in which the user is located includes identifying the space in which the user is located from among the plurality of spaces based on the first distance information and the second distance information.

The method may include receiving a user voice of the user through a microphone of the electronic apparatus; or obtaining third distance information regarding a distance between the user and the electronic apparatus based on a size of the received user voice, wherein the identifying the space in which the user is located includes identifying a space in which the user is located from plurality of spaces based on the first distance information, the second distance information and the third distance information.

The method may include obtaining an image regarding a front of the electronic apparatus through a camera of the electronic apparatus; and obtaining fourth distance information regarding a distance between the user and the electronic apparatus based on whether an object corresponding to the user is included in the obtained image and a size of the object corresponding to the user, wherein the identifying the space in which the user is located includes identifying the space in which the user is located from among a plurality of spaces based on the first distance information, the second distance information, the third distance information, and the fourth distance information.

The method may include obtaining illuminance information regarding a surrounding of the electronic apparatus through an illuminance sensor of the electronic apparatus; or obtaining fifth distance information regarding a distance between the user and the electronic apparatus based on the illuminance information, wherein the identifying the space in which the user is located includes identifying the space in which the user is located from among the plurality of spaces based on the first distance information, the second distance information, the third distance information, the fourth distance information, and the fifth distance information.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a view provided to explain a process of identifying a space in which user is located based on various information obtained according to an embodiment;

FIG. 5 is a view provided to explain an embodiment of controlling resolution and brightness of content displayed through a display when a space in which user is located is maintained for a predetermined time or longer;

DETAILED DESCRIPTION

Figure 1:
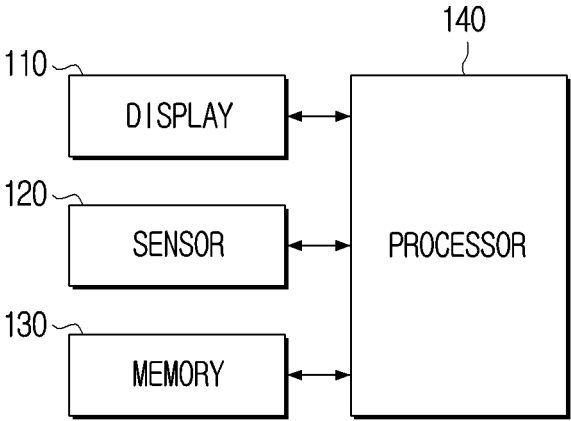
FIG. 1 is a block diagram briefly illustrating configuration of an electronic apparatus according to an embodiment.

The disclosure may be variously modified and have various embodiments. Therefore, embodiments are shown in the accompanying drawings and described in detail in the specification. However, it is to be understood that the scope of the disclosure is not limited to the embodiments, and includes various modifications, equivalents, or alternatives according to the embodiments of the disclosure. Throughout the accompanying drawings, similar components are denoted by similar reference numerals.

In describing the disclosure, the description omits a detailed description of a case in which the detailed description for the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "least one of A or B," "least one of A and B," "one or more of A and/or B" and the like, may include all possible combinations of items enumerated together. For example, "A or B," "at least one of A and B" or "at least one of A or B" may indicate all of 1) only A, 2) only B, or 3) both A and B.

Expressions "first," "second" and the like, used in the disclosure may indicate various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through still another component (for example, a third component).

On the other hand, in case that any component (for example, a first component) is mentioned as being "directly coupled" or "directly connected" to another component (for example, a second component), it is to be understood that still another component (for example, a third component) does not exist between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression a "device configured to" in any situation may indicate that the device may "perform~" together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~err/or" that is to be implemented by hardware.

Various elements and regions in the drawings are schematically shown. Therefore, the spirit of the disclosure is not limited by relative sizes or intervals shown in the accompanying drawings.

Hereinafter, the embodiments of the disclosure are described in detail with reference to the accompanying drawings for those skilled in the art to which the disclosure pertains to easily practice the disclosure.

Figure 2:
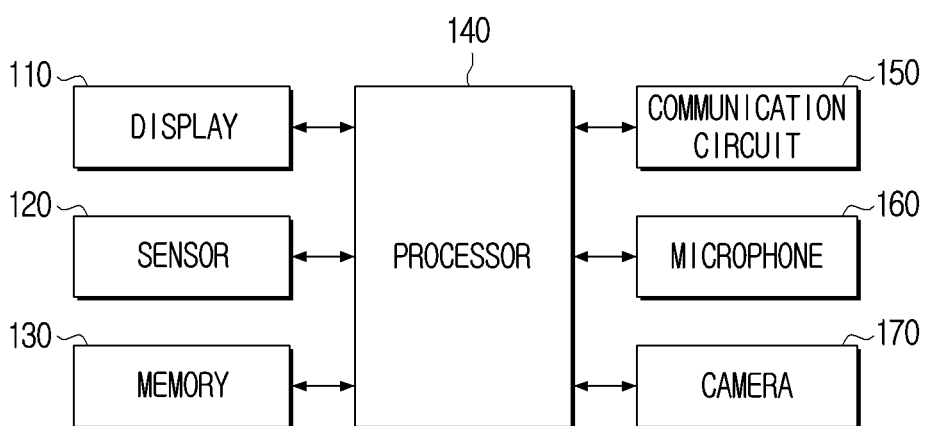
FIG. 2 is a block diagram illustrating configuration of an electronic apparatus in detail according to an embodiment.

FIG. 1 is a block diagram briefly illustrating configuration of an electronic apparatus 100 according to an embodiment, and FIG. 2 is a block diagram illustrating configuration of the electronic apparatus 100 in detail according to an embodiment.

The electronic apparatus 100 according to an embodiment refers to an apparatus capable of controlling a display 110 based on information regarding a distance between a user and the electronic apparatus 100. Specifically, the electronic apparatus 100 may identify the space in which the user is located based on information regarding the distance between the user and the electronic apparatus 100, and control at least one of the resolution or brightness of content displayed through the display 110 based on control information corresponding to the identified space. The electronic apparatus 100 according to an embodiment may be implemented as, for example, a TV, a tablet PC, etc., but there is no limitation on the type of the electronic apparatus 100 according to an embodiment.

As illustrated in FIG. 1, the electronic apparatus 100 according to an embodiment may include the display 110, a sensor 120, a memory 130, and a processor 140. In addition, as illustrated in FIG. 2, the electronic apparatus 100 according to an embodiment may further include a communication circuit 150, a microphone 160 and a camera 170. However, the configurations illustrated in FIG. 1 and FIG. 2 are only examples, and in implementing an embodiment, new configurations can be added in addition to the configurations illustrated in FIG. 1 and FIG. 2, or some configurations may be omitted.

The display 110 may output images or content under the control of the processor 140. Specifically, the display 110 may output images or content under the control of the processor 140. In addition, the display 110 may display a user interface stored in the memory 130. For example, the display 110 may be implemented as a Liquid Crystal Display Panel (LCD), Organic Light Emitting Diodes (OLED), etc., or in some cases, the display 110 may be implemented as a flexible display 110, a transparent display 110, etc. However, the display 110 according to an embodiment is not limited to type.

In various embodiments, the display 110 may display content, images or user interfaces, etc. according to the present disclosure, and may display content in resolution and brightness according to control information under the control of the processor 140. The content according to an embodiment may include content displayed in a standby mode.

The sensor 120 may sense various information inside and outside the electronic apparatus 100. According to various embodiments, the sensor 120 may include a RADAR sensor (Radio Detection and Ranging), a LiDAR sensor (Light Detection And Ranging), and an illuminance sensor. However, the sensor 120 is not limited thereto, and the sensor according to an embodiment may include various types of sensors such as a Global Positioning System (GPS) sensor, a gyro sensor (gyroscope), an acceleration sensor (accelerometer), an Inertial Measurement Unit (IMU) sensor and a motion sensor, a temperature sensor, a humidity sensor, an infrared sensor, a bio sensor, etc.

The memory 130 may include at least one instruction regarding the electronic apparatus 100. In addition, the memory 130 may store an Operating System (O/S) for driving the electronic apparatus 100. In addition, the memory 130 may store various software programs or applications for operating the electronic apparatus 100 according to various embodiments. The memory 130 may include a semiconductor memory such as a flash memory or a magnetic storage medium such as a hard disk.

Specifically, the memory 130 may store various software modules for operating the electronic apparatus 100 according to various embodiments, and the processor 140 may control the operation of the electronic apparatus 100 by executing various software modules stored in the memory 130. In other words, the memory 130 may be accessed by the processor 140, and reading/recording/modifying/deleting/updating of data by the processor 140 may be performed.

The term 'memory 130' in the present disclosure may be used to refer to the memory 130, a ROM within the processor 140, a RAM or a memory card (e.g., a micro SD card, a memory stick) mounted on the electronic apparatus 100.

In particular, according to various embodiments, the memory 130 may store first distance information, second distance information, third distance information, fourth distance information, fifth distance information, illuminance information, operation information, information regarding a plurality of spaces, control information corresponding to each of the plurality of spaces, information regarding content, etc. In addition, various information within the scope of achieving the purpose of the present disclosure may be stored in the memory 130, and the information stored in the memory 130 may be updated as it is received from an external device or input by the user.

The processor 140 controls the overall operations of the electronic apparatus 100. Specifically, the processor 140 is connected to the configuration of the electronic apparatus 100 including the display 110, the sensor 120, the memory 130, the communication circuit 150, the microphone 160, the camera 170, etc., and may control the operation of the electronic apparatus 100 by executing at least one instruction stored in the memory 130.

The processor 140 may be implemented in various ways. For example, the processor 140 may be implemented as at least one of an Application Specific Integrated Circuit (ASIC), an embedded processor, a microprocessor, hardware control logic, hardware Finite State Machine (FSM), or a Digital Signal Processor (DSP). The term 'processor 140' in the present disclosure may be used to refer to a Central Processing Unit (CPU), a Graphic Processing Unit (GPU), a Main Processing Unit (MPU), etc.

In various embodiments, the processor 140 may identify a space in which the user is located based on information regarding a distance between the user of the electronic apparatus 100 and the electronic apparatus 100, and control at least one of the resolution or brightness of content displayed through the display 110 based on control information corresponding to the identified space. The operation of the processor 140 regarding the various embodiments of the present disclosure will be described in detail after the communication circuit 150, the microphone 160 and the camera 170 are described.

The communication circuit 150 includes a circuit, and may perform communication with a server or external device. Specifically, the processor 140 may receive various data or information from a server or external device connected through the communication circuit 150, and transmit various data or information to the server or external device.

The communication circuit 150 may include at least one of a WiFi module, a Bluetooth module, a wireless communication module, an NFC module, or a Ultra Wide Band (UWB) module. Specifically, each of the WiFi module and Bluetooth module may perform communication using a WiFi method and a Bluetooth method, respectively. When using a WiFi module or a Bluetooth module, various connection information such as SSID is first transmitted and received, and various information may be transmitted and received after establishing a communication connection using the same.

In addition, the communication circuit 150 may perform communication according to various communication standards such as IEEE, Zigbee, 3$^{rd}$ Generation (3G), 3$^{rd}$ Generation Partnership Project (3GPP), Long Term Evolution (LTE), 5$^{th}$ Generation (5G), etc. In addition, the NFC module may perform communication in a Near Field Communication (NFC) communication method using various RF-ID frequency bands such as 135 kHz, 13.56 MHz, 433 MHz, 860~960 MHz, and 2.45 GHz. In addition, through communication between UWB antennas, the UWB module may accurately measure Time of Arrival (ToA), which is the time for a pulse to reach a target, and Ange of Arrival (AoA), which is the angle of arrival of the pulse at the transmitter, and accordingly, may accurately recognize precise distance and position indoors within an error range of tens of centimeters.

In various embodiments of the present disclosure, the processor 140 may receive a signal for obtaining information regarding a distance between the user and the electronic apparatus 100 from a user terminal connected to the electronic apparatus 100 through the communication circuit 150. In addition, the processor 140 may receive a signal for obtaining information regarding a distance between the user and an external device from an external device connected to the electronic apparatus 100 through the communication circuit 150. Further, various information or data for achieving the purpose of the present disclosure may be received from an external device through the communication circuit 150.

The microphone 160 may receive a voice signal, and convert the received voice signal into an electrical signal. There is no restriction on the number and type of microphone 160. In various embodiments, a voice signal generated by the user's utterance, specifically, a voice signal corresponding to the user's voice, may be converted into an electrical signal.

The camera 170 may obtain an image regarding at least one object. Specifically, the camera 170 includes the sensor 120, and the sensor 120 may convert light coming through a lens into an electrical image signal. According to various embodiments, the camera 170 may obtain an image regarding the front of the electronic apparatus 100, and the image regarding the front of the electronic apparatus 100 may include an object corresponding to the user.

The processor 140 may implement various embodiments as follows by using the above-described display 110, the sensor 120, the memory 130, the communication circuit 150, the microphone 160, and the camera 170.

According to an embodiment, the processor 140 may obtain first distance information between the user of the electronic apparatus 100 and the electronic apparatus 100 through the sensor 120.

Here, the term 'first distance information' is a term to distinguish distance information obtain through the sensor 120 from other distance information. The sensor 120 may be a distance sensor for measuring/detecting the distance to an object. The distance sensor may be, for example, a 60 GHz Radio Detection and Ranging (RADAR) sensor, but is not limited thereto.

Specifically, the processor 140 may obtain the first distance information regarding the distance between the user and the electronic apparatus by analyzing the electromagnetic waves that radiated by the processor 140 through the sensor 120 and reflected and returned by the user.

According to an embodiment, the processor 140 may receive a first signal from a user terminal of a user connected to the electronic apparatus 100 through the communication circuit 150, and obtain second distance information regarding a distance between the user and the electronic apparatus 100 based on the strength of the received first signal.

Here, the term 'second distance information' is a term to distinguish distance information obtained using the first signal received through the communication circuit 150 from other distance information, and the term 'first signal' is a term used to distinguish it from a second signal that is a signal transmitted to an external device by the user terminal.

According to embodiments, the communication circuit 150 may be a WiFi module or a Bluetooth module, but is not limited thereto. The user terminal may be a smartphone or a tablet PC carried by the user, or may be a smart watch, a wearable robot, AR glasses, etc. worn by the user. However, the type of the user terminal according to an embodiment is not limited to a specific type.

Specifically, the processor 140 may obtain Received Signal Strength Indicator (RSSI) information indicating the strength of the received first signal from the first signal received from the user terminal. The processor 140 may obtain the second distance information regarding a distance between the user and the electronic apparatus 100 using the principle that as the distance between the user terminal and the electronic apparatus 100 increases, the strength of the first signal transmitted from the user terminal decreases, which is received by the electronic apparatus 100.

More specifically, the distance between the user terminal and the electronic apparatus 100 may be measured using an equation such as RSSI=–10 n log d+TxPower, that is, $d=10^{(TxPower-RSSI)(10n)}$. Here, d is the distance between the electronic apparatus 100 and the user terminal, TxPower is the strength of the signal transmitted by the external device 200, RSSI is the RSSI value of the packet received from the user terminal, and n refers to a correction constant according to the presence of an obstacle between the electronic apparatus 100 and the user terminal. For example, when there is no obstacle, it can be treated as n=2.

In the present disclosure, it will be described that the distance between the user terminal and the electronic apparatus 100 is estimated to be the distance between the user and the electronic apparatus 100 based on the assumption that the user is in a state of carrying or wearing the user terminal. However, even when the user does not carrying or wearing the user terminal, if the space in which the user is located is identified by combining the second distance information according to an embodiment with other distance information or the second distance information is obtained multiple times at predetermined time intervals, the accuracy of the distance measurement using the strength of the first signal received from the user terminal can be improved.

According to an embodiment, the processor 140 may receive a user voice of the user through the microphone 160, and obtain third distance information regarding a distance between the user and the electronic apparatus 100 based on the size of the received user voice. Here, the term 'third distance information' is a term to distinguish the distance information obtained by using the microphone 160 from other distance information.

Specifically, the processor 140 may receive a voice signal corresponding to a user voice through the microphone 160, convert the received voice signal into an electrical signal, and obtain information regarding the size of the user voice by analyzing the electrical signal. In addition, the processor 140 may obtain may obtain the third distance information regarding a distance between the user and the electronic apparatus 100 using the principle that as the larger the size of the user voice, the closer the distance between the user and the electronic apparatus 100.

Not only the user voice but also the sound output by the electronic apparatus 100 or an external device can be received through the microphone 160 and thus, the processor 140 may distinguish the user voice and the sound output by the electronic apparatus 100 (or an external device) using voice filtering technology and then, obtain information regarding the size of the user voice.

In the present disclosure, 'user' may refer to any user, but depending on the embodiment, it may also mean a registered user. In other words, the processor 140 may identify whether the user voice is the voice of a pre-registered user by inputting the user voice to a neural network model trained to perform speaker recognition, and apply various embodiments of the present invention only when the user voice is the voice of a pre-registered user.

According to an embodiment, the processor 140 may obtain an image of the front of the electronic apparatus 100 through the camera 170, and obtain fourth distance information regarding a distance between the user and the electronic apparatus 100 based on whether an object corresponding to the user is included in the obtained image and the size of the object corresponding to the user. Here, the term 'fourth distance information' is a term to distinguish the distance information obtained by using the camera 170 from other distance information.

Specifically, the processor 140 may obtain an image of the front of the electronic apparatus 100 through the camera 170, and identify whether an object corresponding to the user is included in the obtained image by inputting the obtained image to a neural network model trained to perform object recognition. Here, 'user' may refer to any user, but depending on the embodiment, it may also mean a registered user If it is identified that an object corresponding to the user is not included in the obtained image, the processor 140 may determine that the user is not present in the front of the electronic apparatus 100 and in this case, the obtained image is not used to obtain the fourth distance information.

On the other hand, if it is determined that an object corresponding to the user is included in the obtained image, the processor 140 may obtain the fourth distance information regarding a distance between the user and the electronic apparatus 100 using the principle that the larger the size of the object corresponding to the user, the closer the distance between the user and the electronic apparatus 100.

According to an embodiment, the processor 140 may obtain illuminance information regarding the surroundings of the electronic apparatus 100 through an illuminance sensor, and obtain fifth distance information regarding a distance between the user and the electronic apparatus 100 based on the illuminance information. Here, the term 'fifth distance information' is a term to distinguish the distance information obtained by using the illuminance sensor from other distance information.

Specifically, the processor 140 may obtain illuminance information regarding the surroundings of the electronic apparatus 100 through an illuminance sensor, and obtain the fifth distance information regarding a distance between the user and the electronic apparatus 100 based on information regarding the time when the illuminance information is obtained and the illuminance information. For example, if the time when the illuminance information is obtained is 3 AM and the illuminance information indicates that the fluorescent light is turned on, the processor 140 may identify that the user is in an 'adjacent space' or 'same space' as the electronic apparatus 100.

As described above, when the first distance information, the second distance information, the third information, the fourth information, and the fifth information are obtained, the processor 140 may identify the space in which the user is located from among a plurality of spaces predefined according to the distance from the electronic apparatus 100 based on at least one of the first distance information, the second distance information, the third distance information, the fourth distance information or the fifth distance information.

In the present disclosure, the process of identifying the location of the user and the space in which the user is located based on the distance information (e.g., the first distance information, the second distance information, the third distance information, the fourth distance information, the fifth distance information, etc.) may be implemented through various known techniques such as trilateration, and there are no restrictions on techniques.

The process of obtaining final distance information based on two or more of the first distance information, the second distance information, the third distance information, the fourth distance information and the fifth distance information will be described with reference to FIG. 3 and hereinafter, the process of identifying the space in which the user is located from among a plurality of spaces based on one of the first distance information, the second distance information, the third distance information, the fourth distance information, and fifth distance information will be described.

In the present disclosure, the plurality of spaces may be defined according to the distance from the electronic apparatus 100, and they may be defined differently depending on whether the target location is at home, at a company, etc. For example, if the target location is inside the home, the plurality of spaces may include a space in which the distance from the electronic apparatus 100 within the house is less than 5 m (hereinafter, referred to as 'adjacent space'), a space in which the distance from the electronic apparatus 100 is equal to or greater than 5 m and less than 10 m and thus, it is assumed to be in the same room as the electronic apparatus 100 (hereinafter, referred to as 'same space'), a space in which the distance from the electronic apparatus 100 is equal to or greater than 10 m and less than 20 m and thus, it is assumed to be in a different room from the electronic apparatus 100 (hereinafter, referred to as 'another space in the house'), and a space in which the distance from the electronic apparatus 100 is equal to or greater than 20 m and thus, it is assumed to be not a space in the house (hereinafter, referred to as an 'outer space').

In the above example, if the first distance information obtained through the sensor 120 indicates that the distance between the user and the electronic apparatus 100 is 7 m, the processor 140 may identify that the user is in the 'same space' as the electronic apparatus 100 from among a plurality of spaces.

A plurality of spaces are predefined by a developer or a user, and information regarding the plurality of predefined spaces may be stored in the memory 130. In addition, the plurality of spaces may be defined based on information regarding the user's location received from a user terminal over a predetermined period of time.

Specifically, the processor 140 may obtain information regarding the user's location from a user terminal over a predetermined period of time. When the target location is inside the home, information regarding the user's location may include information regarding each location the user moved inside the home for a certain period of time (e.g., 100 hours). The processor 140 may obtain map information indicating spaces within the house based on information regarding the user's location collected over a certain period of time. In addition, the processor 140 may obtain map information partitioning spaces inside the home based on information regarding the location of objects such as walls and furniture, etc. detected through the sensor 120, along with information regarding the user's location received over a certain period of time. The processor 140 may obtain and store information regarding a plurality of spaces in the memory 130 based on the map information indicating the spaces inside the home and accordingly, the plurality of spaces can be defined.

In the above, the process of identifying the space in which the user is located from among a plurality of spaces using distance information indicating a distance between the user and the electronic apparatus 100 has been described. However, according to an embodiment, the processor 140 may identify the space in which the user is located from among a plurality of spaces based on information regarding the strength of a signal transmitted from a user terminal to the electronic apparatus 100 and a plurality of external devices.

Specifically, the processor 140 may receive information regarding the strength of the second signal transmitted by a user terminal from each of a plurality of external devices connected to the electronic apparatus 100 through the communication circuit 150, and identify the space in which the user is located based on the information regarding the strength of the second signal received from each of the plurality of external devices. Here, the term 'the second signal' is used to distinguish it from the first signal, which is a signal transmitted to the electronic apparatus 100 by the user terminal.

More specifically, the first signal transmitted to the electronic apparatus 100 by the user terminal may be received through the communication circuit 150 of the electronic apparatus 100, and the processor 140 may obtain information regarding the strength of the received first signal. Likewise, the second signal may be transmitted to each of a plurality of external devices by the user terminal, and each of the plurality of external devices may obtain information regarding the strength of the second signal and transmit it to the electronic apparatus 100. When information regarding the strength of the first signal and the strength of the second signal is obtained, the processor 140 may identify the space in which the user is located from among a plurality of spaces by identifying the device with the greatest strength of the signal transmitted by the user terminal from among the electronic apparatus 100 and the plurality of external devices.

When the space in which the user is located is identified, the processor 140 may control the operation of the electronic apparatus 100 based on control information corresponding to the identified space from among predetermined control information for each of the plurality of spaces.

In the present disclosure, the control information is used as a general term for information about instructions for controlling the operation of the electronic apparatus 100. Specifically, the control information may include information regarding the resolution of content corresponding to each of the plurality of spaces and information regarding brightness of content corresponding to each of the plurality of spaces. In addition, the control information may include various information such as information regarding content or user space corresponding to each of the plurality of spaces, information regarding the sound volume of content, information regarding power control of the electronic apparatus 100, etc.

According to an embodiment, the processor 140 may control the resolution of content displayed through the display 110 based on control information corresponding to the identified space.

As described above, the control information includes information regarding the resolution of content corresponding to each of the plurality of spaces and here, the information regarding the resolution of content may be obtained based on information regarding an optimal viewing distance according to the size and resolution of the display 110 and stored in the memory 130. For example, the information regarding the resolution of content, if the size of the display 110 of the electronic apparatus 100 is 70 inches and the distance between the user and the electronic apparatus 100 is 5 m, may include information that the maximum resolution that can be recognized by the user is 720 p.

In the above embodiment, if the electronic apparatus 100 is displaying content with a resolution of 1080p through the display 110, it can be said that power consumption is wasted to display content exceeding the resolution that can be recognized by the user. Accordingly, the processor 140 may control the display 110 to change the resolution of content displayed through the display 110 to 720p. The information regarding the optimal viewing distance according to the size and resolution of the display 110 will be described in greater detail with reference to FIG. 4.

According to an embodiment, the processor 140 may control the brightness of the content displayed through the display 110 based on control information corresponding to the identified space. Specifically, if the distance between the user and the electronic apparatus 100 is 17 m, it may be assumed that the user would not watch the content displayed through the display 110. Thus, when the content is displayed at excessively high brightness, power consumption may be wasted unnecessarily. Accordingly, the processor 140 may control the display 110 to display the content based on a predetermined brightness value corresponding to a case in which the distance between the user and the electronic apparatus 100 is 17 m.

According to an embodiment, the processor 140 may receive operation information regarding the user's movement from a remote control device for controlling a user terminal or the electronic apparatus 100 through the communication circuit 150, and control at least one of the resolution of the content or the brightness of the content based on the control information and operation information corresponding to the identified space. In the present disclosure, the operation information is used as a term for all information that can indicate the user's movement.

Specifically, the user terminal may obtain information regarding the movement of the user terminal through a gyro sensor (gyroscope), an acceleration sensor (accelerometer), an Inertial Measurement Unit (IMU), a motion sensor, etc., and obtain operation information of the user's movement based on the information regarding the movement of the user terminal. In this case, the information regarding the movement of the user terminal itself may be operation information regarding the user's movement. In addition, the user terminal may obtain operation information regarding the user's movement based on information obtained through a distance sensor, a microphone, a camera, etc. included in the user terminal.

In addition, the remote control device may include a solar charging module, information regarding the movement of the remote control device may be obtained by detecting a charging amount change trend through the solar charging module, and operation information regarding the user's movement may be obtained based on the information regarding the movement of the remote control device. In this case, the information regarding the movement of the remote control device itself may be operation information regarding the user's movement.

For example, if the user is located in an adjacent space in which the distance from the electronic apparatus 100 is less than 5 m but there is no movement for 1 hour, the user may be asleep and it may be desirable to reduce power consumption. Accordingly, the processor 140 may change the resolution of content to be lower than the current resolution based on control information and operation corresponding to the identified space, and may change the brightness of the content to be lower than the current brightness.

The operation information regarding the user's movement may be obtained according to whether to control the electronic apparatus 100, a user terminal, a remote control device or an external device as the user inputs a user command to the electronic apparatus 100, the user terminal, the remote control device or the external device according to an embodiment.

In the above, the feature of the processor 140 controlling at least one of the resolution or brightness of content displayed through the display 110 has been described. However, what is controlled in the present disclosure is not limited to the resolution or brightness of content. For example, the processor 140 may provide different content or user interface for each space in which the user is located, change whether to activate the graphic/animation effects of the content or user interface, or adjust the sound volume of the content. In addition, the processor 140 may control a power supply to stop the display 110 or turn off the power of the electronic apparatus 100.

In the above, only the operation when the space in which the user is located is identified has been described, but according to an embodiment, the processor 140 may perform different operations based on whether the space in which the user is located is maintained over a predetermined period of time. Specifically, when it is identified that the space identified as the space in which the user is located is maintained over a predetermined period of time, the processor 140 may control to change at least one of the resolution or brightness of the content displayed through the display 110. An embodiment in which the space in which the user is located is maintained over a predetermined period of time will be described in greater detail with reference to FIG. 5.

According to the various embodiments described with reference to FIG. 1 and FIG. 2 above, the electronic apparatus 100 may reduce power consumption of the electronic apparatus 100 without compromising the user convenience by controlling at least one of the resolution or brightness of the content displayed through the display 110 based on information regarding a distance between the user and the electronic apparatus 100.

According to various embodiments, the electronic apparatus 100 may consider the distance between the user and the electronic apparatus 100 and the space in which the user is located in stages and reduce power consumption of the electronic apparatus 100 in a segmented manner for each stage, thereby providing a power consumption reduction effect suitable for the user's actual usage environment.

FIG. 3 is a view provided to explain a process of identifying a space in which user is located based on various information obtained according to an embodiment.

Referring to FIG. 3, information obtained according to an embodiment may be information regarding a distance, that is, first distance information regarding the distance between the user and the electronic apparatus 100 obtained through the sensor 120. For example, the first distance information may be information indicating that the distance between the user and the electronic apparatus 100 is 0 to 5 m or information indicating that the distance between the user and the electronic apparatus 100 is not detected.

When the information that the distance between the user and the electronic apparatus 100 is 0 to 5 m is obtained, the processor 140 may identify that the space in which the user is located is an 'adjacent space' from among a plurality of spaces as defined above with reference to FIG. 1 and FIG. 2. When the information that the distance between the user and the electronic apparatus 100 is not detected is obtained, the processor 140 may identify the space in which the user is located from among the plurality of spaces based on information regarding signal strength or information regarding a user voice.

Referring to FIG. 3, the information obtained according to an embodiment may be information regarding signal intensity, that is, information regarding the strength of the signal received from a user terminal through the communication circuit 150. The processor 140 may obtain second distance information regarding a distance between the user and the electronic apparatus 100 based on information regarding signal strength as described above. For example, the information regarding signal strength may be information that the strength of the signal received from a user terminal is equal to or greater than −70 dBm, information that the strength of the signal received from the user terminal is equal to greater than −60 dBm and less than −70 dBm, or information that the strength of the signal received from the user terminal is less than −60 dBm.

In the embodiment of FIG. 3, the processor 140 may identify the space in which the user is located from among the plurality of spaces based on information regarding signal strength as well as information regarding distance.

When information that the distance between the user and the electronic apparatus 100 is not detected is obtained and information that the strength of the signal received from the user terminal is equal to or greater than −70 dBm is obtained, the processor 140 may identify that the space in which the user is located is the 'same space' from among a plurality of predefined spaces.

When information that the distance between the user and the electronic apparatus 100 is not detected is obtained and information that the strength of the signal received from the user terminal is equal to or greater than −60 dBm and less than −70 dBm is obtained, the processor 140 may identify that the space in which the user is located is 'another space in the house' from among the plurality of predefined spaces.

When information that the distance between the user and the electronic apparatus 100 is not detected is obtained and information that the strength of the signal received from the user terminal is less than −60 dBm is obtained, the processor 140 may identify that the space in which the user is located is an 'outer space' from among the plurality of predefined spaces.

Referring to FIG. 3, information obtained according to an embodiment may be information regarding a user voice, that is, information regarding the size of the user voice obtained through the microphone 160. The processor 140 may obtain third distance information regarding the distance between the user and the electronic apparatus 100 based on the information regarding the size of a user voice as described above. For example, the information regarding the size of a user voice may include information that the size of the user voice received through the microphone 160 is 40 dB, information that the size of the user voice received through the microphone 160 is 10 dB and information that the size of the user voice received through the microphone 160 is not detected.

In the embodiment of FIG. 3, the processor 140 may identify the space in which the user is located from among a plurality of spaces based on information regarding the size of a user voice as well as distance information and signal strength information.

When information that the distance between the user and the electronic apparatus 100 is not detected is obtained, information that the strength of the signal received from a user terminal is equal to or greater than −60 dBm and less than −70 dBm is obtained, and information that the size of the user voice received through the microphone 160 is 40 dB is obtained, the processor 140 may identify that the space in which the user is located is the 'same space' from among the plurality of predefined spaces.

When information that the distance between the user and the electronic apparatus 100 is not detected is obtained, information that the strength of the signal received from a user terminal is less than −60 dBm is obtained, and information that the size of the user voice received through the microphone 160 is 10 dB is obtained, the processor 140 may identify that the space in which the user is located is 'another space in the house' from among the plurality of predefined spaces.

When information that the distance between the user and the electronic apparatus 100 is not detected is obtained, information that the strength of the signal received from a user terminal is less than −60 dBm is obtained, and information that the size of the user voice received through the microphone 160 is not detected is obtained, the processor 140 may identify that the space in which the user is located is an 'outer space' from among the plurality of predefined spaces.

Unlike the embodiment of FIG. 3, even if information that the distance between the user and the electronic apparatus 100 is not detected is obtained and information that the size of the user voice received through the microphone 160 is 40 dB is obtained, when information that the strength of the signal received from a user terminal is less than −60 dBm is obtained, the processor 140 may identify that the space in which the user is located is not 'another space in the house' from among the plurality of predefined spaces but an 'outer space', or may identify that the space in which the user is located from among the plurality of spaces based on other information not included in the embodiment of FIG. 3.

The process of identifying the space in which the user is located from among a plurality of spaces according to an embodiment is not limited to the embodiment of FIG. 3, and it may be determined in various ways to correspond to each combination of detection results of various information according to an embodiment. According to embodiments, information regarding the plurality of spaces may be configured as data in the form of a look-up table and stored in the memory 130.

Figure 4:
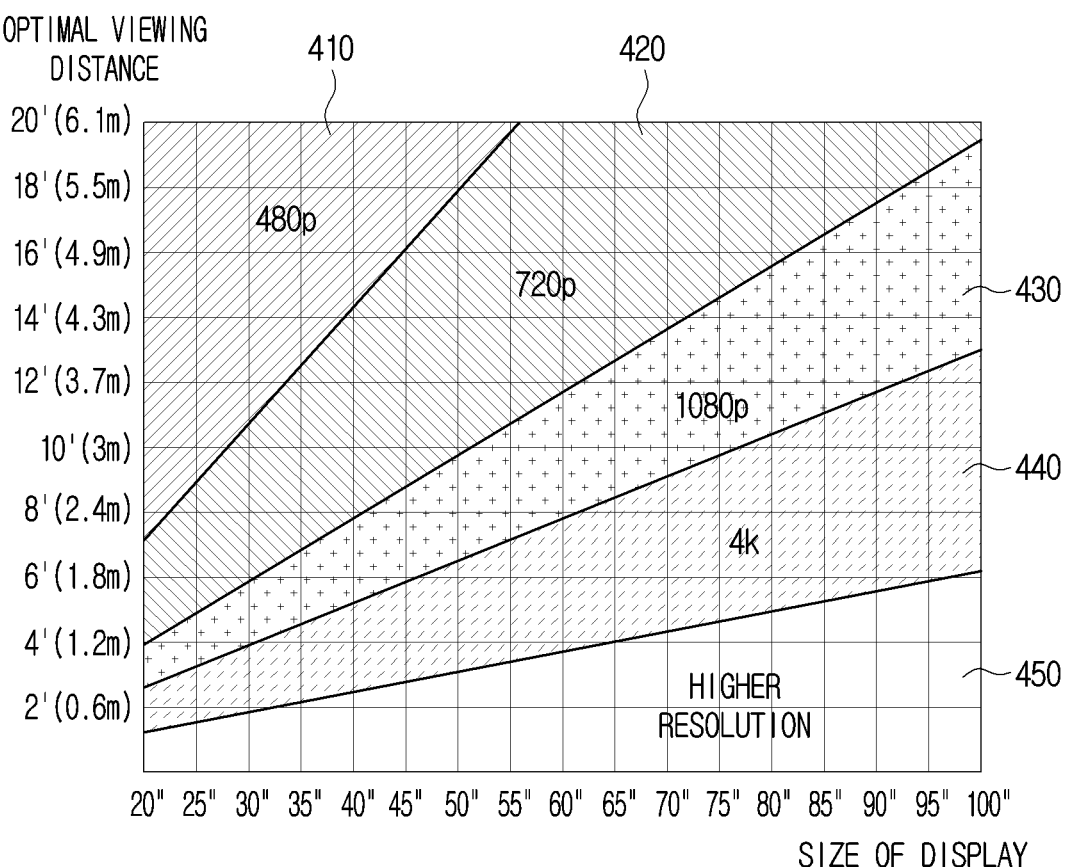
FIG. 4 is a graph illustrating information regarding an optimal viewing distance according to a size and resolution of a display.

FIG. 4 is a graph illustrating information regarding an optimal viewing distance according to the size and resolution of the display 110.

As described above with reference to FIG. 1 and FIG. 2, control information according to an embodiment includes information regarding the resolution of content corresponding to each of a plurality of spaces, and information regarding the resolution of the content may be obtained based on information as illustrated in FIG. 4 and stored in the memory 130.

In FIG. 4, the horizontal axis of the graph represents the size of the display 110, the vertical axis of the graph represents the optimal viewing distance, and each of a plurality of areas 410, 420, 430, 440, 450 of the graph represents resolution. For example, it can be interpreted that when the size of the display 110 is 50 inches, content with resolution of 720 p can be viewed when the user is at a viewing distance of at least 5.5 m, content with resolution of 1080 p can be viewed when the user is at a viewing distance of at least 2.9 m, and content with resolution of 4 k can be viewed when the user is at a viewing distance of at least 1.9 m.

The size of the display 110 included in the electronic apparatus 100 is determined, and the distance from the electronic apparatus 100 corresponding to each of a plurality of spaces is determined when defining the plurality of spaces. Accordingly, information regarding the resolution of content corresponding to each of the plurality of spaces may be determined based on information as illustrated in FIG. 4. For example, when the size of the display 110 included in the electronic apparatus 100 is 70 inches, the resolution of the content corresponding to the 'adjacent space' from among the plurality of spaces defined in FIG. 1 and FIG. 2 may be determined to be 720 p.

According to an embodiment, the processor 140 may control the resolution of the content displayed through the display 110 based on information regarding the resolution of the content corresponding to the space in which the user is located from among the plurality of spaces.

For example, if the size of the display 110 of the electronic apparatus 100 is 70 inches and the space in which the user is located is an 'adjacent space', when content with a resolution of 1080 p is displayed through the display 110, it can be said that power is wasted to display content that exceeds the resolution perceivable by the user. Accordingly, the processor 140 may control the display 110 to change the resolution of the content displayed through the display 110 to 720 p.

FIG. 5 is a view provided to explain an embodiment of controlling resolution and brightness of content displayed through the display 110 when a space in which user is located is maintained for a predetermined time or longer.

As illustrated in FIG. 5, the space in which the user is located may be 'another space in the house' from among a plurality of spaces defined in FIG. 1 and FIG. 2.

When the space in which the user is located is 'another space in the house', the processor 140 may control the display 110 to change the resolution of content output through the display 110 to 720 p and the brightness of content output through the display 110 to 80% of maximum brightness.

The processor 140 may identify in which the user is located at predetermined intervals. When it is identified that the space in which the user is located is 'another space in the house' over 30 minutes, the processor 140 may control the display 110 to change the resolution of the content output through the display 110 to 480 p and change the brightness of the content output through the display 110 to 50% of the maximum brightness.

In addition, when it is identified that the space in which the user is located is 'another space in the house' over 1 hour, the processor 140 may control the display 110 to change the resolution of the content output through the display 110 to 320 p and change the brightness of the content output through the display 110 to 30% of the maximum brightness.

As illustrated in FIG. 5, the space in which the user is located may be an 'outer space' from among the plurality of spaces defined in FIG. 1 and FIG. 2.

When the space in which the user is located is an 'outer space', the processor 140 may control the display 110 to change the resolution of the content output through the display 110 to 480 p and change the brightness of the content output through the display 110 to 50% of the maximum brightness.

The processor 140 may identify the space in which the user is located at predetermined intervals. When it is identified that the space in which the user is located is an 'outer space' over 30 minutes, the processor 140 may control the display 110 to change the resolution of the content output through the display 110 to 320 p and change the brightness of the content output through the display 110 to 40% of the maximum brightness.

In addition, when it is identified that the space in which the user is located is an 'outer space' over 1 hour, the processor 140 may control the display 110 to maintain the resolution of the content output through the display 110 to 320, but change the brightness of the content output through the display 110 to 20% of the maximum brightness.

Further, when it is identified that the space in which the user is located is an 'outer space' over 2 hours, the processor 140 may control the display 110 to stop outputting content, and control the power unit to turn off the power of the electronic apparatus 100.

Figure 6:
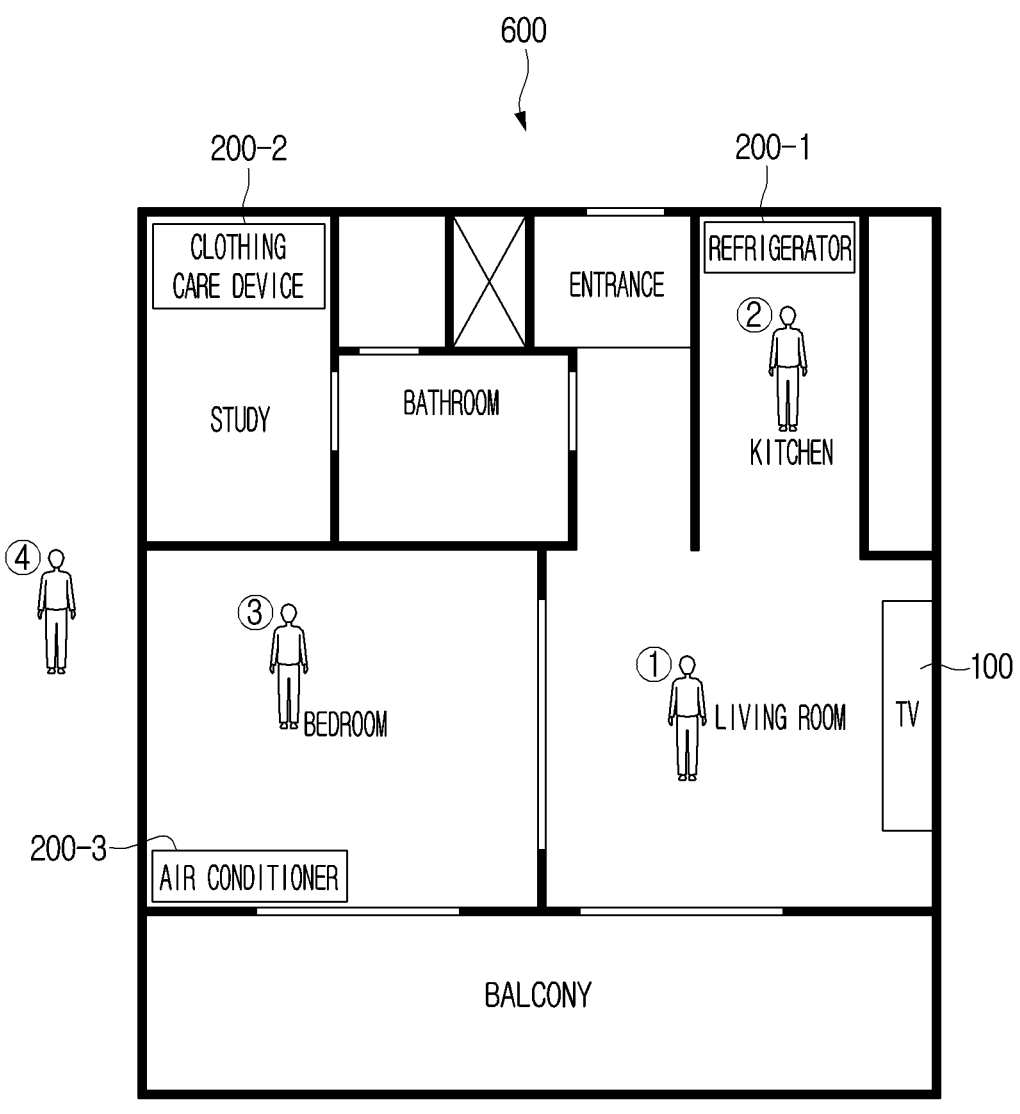
FIG. 6 is a view provided to explain a process of identifying a space in which user is located based on various information that an electronic apparatus receives from an external device.

FIG. 6 is a view provided to explain a process of identifying a space in which a user is located based on various information that the electronic apparatus 100 receives from an external device.

As described above, the processor 140 may receive information regarding the strength of the second signal transmitted by a user terminal from each of a plurality of external devices 200-1, 200-2, 200-3 connected to the electronic apparatus 100 through the communication circuit 150, and identify the space in which the user is located from among a plurality of spaces based on the information regarding the strength of the first signal and the information regarding the strength of the second signal received from each of the plurality of external devices 200-1, 200-2, 200-3.

As illustrated in FIG. 6, the electronic apparatus 100 may be implemented as the TV 100 (hereinafter, the electronic apparatus 100 will be referred to as 'TV 100' in description for FIG. 6), and the electronic apparatus 100 may be connected to the plurality of external devices 200-1, 200-2, 200-3 such as the refrigerator 200-1, the clothing management device 200-2 and the air conditioner 200-3 through the communication circuit 150. Each of the refrigerator 200-1, the clothing management device 200-2 and the air conditioner 200-3 as well as the TV 100 may receive the second signal transmitted from a user terminal, obtain information regarding the strength of the received second signal, and transmit information regarding the strength of the obtained second signal to the TV 100.

When the user is located in ①of FIG. 6, the strength of the first signal transmitted from the user terminal to the TV 100 is the greatest and then, the strength of the second signal transmitted from the user terminal to the refrigerator 200-1, the strength of the second signal transmitted from the user terminal to the air conditioner 200-3, and the strength of the second signal transmitted from the user terminal to the clothing management device 200-2. In this case, the processor 140 of the TV 100 may identify that the user is located in the 'living room' among 'living room', 'kitchen', 'bedroom', 'balcony', 'bathroom', and 'entrance' which are a plurality of predefined spaces.

When the user is located in ② of FIG. 6, the strength of the second signal transmitted from the user terminal to the refrigerator 200-1 is the greatest and then, the strength of the first signal transmitted from the user terminal to the TV 100, the strength of the second signal transmitted from the user terminal to the air conditioner 200-3 and the strength of the second signal transmitted from the user terminal to the clothing management device 200-2. In this case, the processor 140 of the TV 100 may identify that the user is located in the 'kitchen' among the plurality of predefined spaces.

When the user is located in ③ of FIG. 6, the strength of the second signal transmitted from the user terminal to the air conditioner 200-3 is the greatest and then, the strength of the second signal transmitted from the user terminal to the clothing management device 200-2, the strength of the first signal transmitted from the user terminal to the TV 100, and the strength of the second signal transmitted from the user terminal to the refrigerator 200-1. In this case, the processor 140 of the TV 100 may identify that the user is located in the 'bedroom' among the plurality of predefined spaces.

When the user is located in ④ of FIG. 6, all of the strength of the first signal transmitted from the user terminal to the TV 100, strength of the second signal transmitted from the user terminal to the refrigerator 200-1, the strength of the second signal transmitted from the user terminal to the air conditioner 200-3, and the strength of the second signal transmitted from the user terminal to the clothing management device 200-2 may be less than a predetermined threshold value. In this case, the processor 140 of the TV 100 may identify that the user is located in an 'outer space' from among the plurality of predefined spaces.

In the above, an embodiment in which the space in which the user is located from among a plurality of spaces is identified using information regarding the strength of the second signal received from the plurality of external devices 200-1, 200-2, 200-3 has been described, but information that can be used to identify the space in which the user is located among information received from the external devices may vary. Specifically, the processor 140 of the TV 100 may receive information regarding whether there is a user input (e.g., button input, touch input, voice input, etc.) for each of the plurality of external devices 200-1, 200-2, 200-3 from each of the plurality of external devices 200-1, 200-2, 200-3, and identify the space in which the user is located by identifying whether the user is close to the plurality of external devices 200-1, 200-2, 200-3 based thereon.

Each of the refrigerator 200-1, the clothing management device 200-2 and the air conditioner 200-3 as well as the TV 100 may include a distance sensor capable of detecting information regarding the distance from the user, and may identify the space in which the user is located by using distance information received from each of the refrigerator 200-1, the clothing management device 200-2 and the air conditioner 200-3 along with distance information obtained through the distance sensor of the TV 100.

Figure 7:
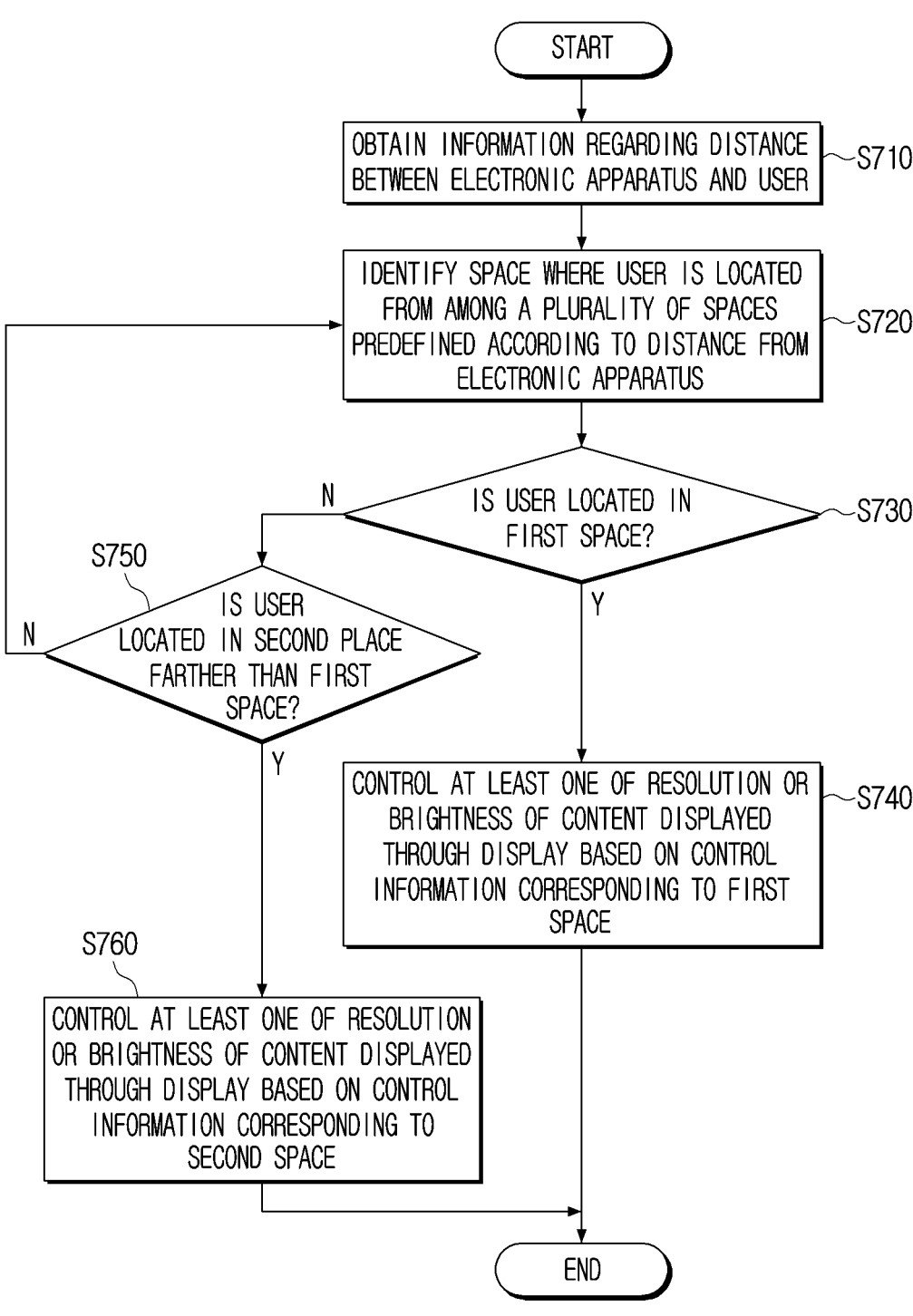
FIG. 7 is a flowchart illustrating a controlling method of an electronic apparatus according to an embodiment.

FIG. 7 is a flowchart illustrating a controlling method of the electronic apparatus 100 according to an embodiment.

Referring to FIG. 7, the electronic apparatus 100 may obtain distance information regarding the distance between the electronic apparatus 100 and the user (S710). Here, the distance information may include the first distance information, second distance information, third distance information, fourth distance information, and fifth distance information defined in the description of FIG. 1 and FIG. 2.

The electronic apparatus 100 may identify the space in which the user is located from among the plurality of predefined spaces according to the distance from the electronic apparatus 100 based on the distance information (S720). Here, the plurality of predefined spaces may be defined as 'adjacent space', 'same space', 'another space in the house', and 'outer space' as defined in the description for FIG. 1 and FIG. 2.

Specifically, the electronic apparatus 100 may obtain the first distance information regarding the distance between the user of the electronic apparatus 100 and the electronic apparatus 100 through a sensor included in the electronic apparatus 100. The electronic apparatus 100 may receive the first signal from the user's user terminal connected to the electronic apparatus 100 through a communication circuit included in the electronic apparatus 100, and obtain the second distance information regarding the distance between the user and the electronic apparatus 100 based on the strength of the received first signal. The electronic apparatus 100 may receive the user's voice through a microphone included in the electronic apparatus 100, and obtain the third distance information regarding the distance between the user and the electronic apparatus based on the size of the received user voice. The electronic apparatus 100 may obtain an image regarding the front of the electronic apparatus 100 through a camera included in the electronic apparatus 100, and obtain the fourth distance information regarding the distance between the user and the electronic apparatus 100 based on whether an object corresponding to the user is included in the obtained image and the size of the object corresponding to the user. The electronic apparatus 100 may obtain illuminance information regarding the surrounding of the electronic apparatus 100 through an illuminance sensor included in the electronic apparatus 100, and obtain the fifth distance information regarding the distance between the user and the electronic apparatus 100 based on the illuminance information.

The electronic apparatus 100 may identify the space in which the user is located from among the plurality of predefined spaces according to the distance from the electronic apparatus 100 based on at least one of the first distance information, second distance information, third distance information, fourth distance information, or fifth distance information.

When the space in which the user is located is identified from among the plurality of spaces, the electronic apparatus 100 may control at least one of resolution or brightness of the content displayed through the display included in the electronic apparatus 100 based on control information corresponding to the identified space among control information predetermined for each of the plurality of spaces.

Specifically, when the user is located in a first space (S730—Y), the electronic apparatus 100 may control at least one of resolution or brightness of the content displayed through the display based on control information corresponding to the first space (S740). When the user is not located in the first space (S730—N) and is located in a second space farther than the first space (S750—Y), the electronic apparatus 100 may control at least one of resolution or brightness of the content displayed through the display based on control information corresponding to the second space (S760).

According to an embodiment, the electronic apparatus 100 may control resolution of the content displayed through the display based on control information corresponding to the identified space, and control brightness of the content displayed through the display based on control information corresponding to the identified space.

According to an embodiment, the electronic apparatus 100 may receive operation information regarding the user's movement from a user terminal through a communication circuit or a remote control device for controlling the electronic apparatus 100, and control at least one of resolution or brightness of the content based on control information and operation information corresponding to the identified space.

The controlling method of the electronic apparatus 100 according to the above-described embodiment may be implemented as a program and provided in the electronic apparatus 100. A program including the controlling method of the electronic apparatus 100 may be stored and provided in a non-transitory computer readable recording medium.

Specifically, in a non-transitory computer readable recording medium including the program for executing the controlling method of the electronic apparatus 100, the controlling method of the electronic apparatus 100 includes obtaining distance information regarding the distance between the user of the electronic apparatus 100 and the electronic apparatus 100, identifying the space in which the user is located from among a plurality of predefined spaces according to the distance from the electronic apparatus 100 based on the distance information and controlling at least one of resolution or brightness of the content displayed through the display included in the electronic apparatus 100 based on control information corresponding to the identified space from among control information predefined for each of the plurality of spaces.

In the above, the controlling method of the electronic apparatus 100 and the computer readable recording medium including the program for executing the controlling method of the electronic apparatus 100 have been briefly described, but this reason is to omit the redundant description. Various embodiments regarding the electronic apparatus 100 can also be applied to the controlling method of the electronic apparatus 100 and the computer readable recording medium including the program for executing the controlling method of the electronic apparatus 100.

As described above, functions related to the speaker recognition model and object recognition model may be performed through a memory and a processor.

The processor may consist of one or a plurality of processors. Here, the one or plurality of processors may be generic-purpose processors such as a CPU, an AP, etc., graphic-dedicated processors such as a GPU, a VPU, etc., or artificial intelligence-dedicated processors such as an NPU.

The one or plurality of processors perform control to process input data according to predefined operation rules or an artificial intelligence model stored in a non-volatile memory and a volatile memory. The predefined operation rules or the artificial intelligence model are characterized in that they are made through learning.

Here, being made through learning indicates that a learning algorithm is applied to a plurality of learning data, and predefined operation rules or an artificial intelligence model having characteristics are thereby made. Such learning may be performed in a device itself wherein artificial intelligence is performed according to the disclosure, or through a separate server/system.

An artificial intelligence model may consist of a plurality of neural network layers. Each layer has a plurality of weight values, and performs an operation of the layer through the operation result of the previous layer and an operation of the plurality of weight values. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), and deep Q-networks, etc., but the neural network in the disclosure is not limited to the aforementioned examples excluding specified cases.

A learning algorithm is a method of training subject device (e.g., a robot) by using a plurality of learning data and thereby making the subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

A storage medium that is readable by machines may be provided in the form of a non-transitory storage medium. Here, the term 'non-transitory' only indicates that a storage medium is a tangible device, and does not include signals (e.g.: electromagnetic waves), and the term does not distinguish a case wherein data is stored in the storage medium semi-permanently and a case wherein data is stored in the storage medium temporarily. For example, 'a non-transitory storage medium' may include a buffer wherein data is stored temporarily.

According to an embodiment, methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly between two user devices (e.g.: smartphones), or on-line (e.g.: download or upload) through an application store (e.g.: Play Store™). In the case of on-line distribution, at least a portion of a computer program product (e.g.: a downloadable app) may be stored in a storage medium readable by machines such as the server of the manufacturer, the server of the application store, and the memory 130 of the relay server at least temporarily, or may be generated temporarily.

Also, each of the components according to the various embodiments of the disclosure described above (e.g.: a module or a program) may consist of a singular object or a plurality of objects. Further, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner.

Operations performed by a module, a program, or other components according to the various embodiments may be executed sequentially, in parallel, repetitively, or heuristically. Or, at least some of the operations may be executed in a different order or omitted, or other operations may be added.

The term "part" or "module" used in the disclosure may include a unit consisting of hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may be constituted as an application-specific integrated circuit (ASIC).

Also, the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic apparatus 2).

In case an instruction is executed by a processor, the processor may perform a function corresponding to the instruction by itself, or by using other components under its control. An instruction may include a code that is generated or executed by a compiler or an interpreter.

Also, while certain embodiments of the disclosure have been shown and described, the disclosure is not limited to the aforementioned embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
a display;
a sensor;
a memory; and
a processor configured to:
    obtain first distance information regarding a distance between a user of the electronic apparatus and the electronic apparatus located at a first location through the sensor;
    identify a space in which the user is located from among three or more predefined spaces at the first location according to a distance from the electronic apparatus based on the first distance information; and
    control at least one of a resolution or a brightness of content displayed through the display based on control information corresponding to the identified space from among predetermined control information for each of the three or more predefined spaces at the first location.

2. The electronic apparatus as claimed in claim 1, further comprising:
a communication circuit,
wherein the processor is further configured to:
    receive a first signal from a user terminal of the user connected to the electronic apparatus through the communication circuit;
    obtain second distance information regarding a distance between the user and the electronic apparatus based on a strength of the received first signal; and
    identify the space in which the user is located from among the predefined spaces based on the first distance information and the second distance information.

3. The electronic apparatus as claimed in claim 2, further comprising:
a microphone,
wherein the processor is further configured to:
    receive a user voice of the user through the microphone;

obtain third distance information regarding a distance between the user and the electronic apparatus based on a size of the received user voice;
    identify the space in which the user is located from among the predefined spaces based on the first distance information, the second distance information and the third distance information,
    determine that one of the first distance information, the second distance information, and third distance information is not detected, and
    wherein when one of the first distance information, the second distance information, and third information is not detected, the space identification is determined based on a combination of the first distance information, the second distance information, and the third distance information that is detected.

4. The electronic apparatus as claimed in claim 3, further comprising:
a camera,
wherein the processor is further configured to:
    obtain an image regarding a front of the electronic apparatus through the camera;
    obtain fourth distance information regarding a distance between the user and the electronic apparatus based on whether an object corresponding to the user is included in the obtained image and a size of the object corresponding to the user; and
    identify the space in which the user is located from among the predefined spaces based on the first distance information, the second distance information, the third distance information, and the fourth distance information.

5. The electronic apparatus as claimed in claim 4, wherein the sensor comprises an illuminance sensor, and
wherein the processor is further configured to:
    obtain illuminance information regarding a surrounding of the electronic apparatus through the illuminance sensor;
    obtain fifth distance information regarding a distance between the user and the electronic apparatus based on the illuminance information; and
    identify the space in which the user is located from among the predefined spaces based on the first distance information, the second distance information, the third distance information, the fourth distance information, and the fifth distance information.

6. The electronic apparatus as claimed in claim 5, wherein the processor is further configured to:
receive information regarding a strength of a second signal transmitted by the user terminal from each of a plurality of external devices connected to the electronic apparatus through the communication circuit; and
identify the space in which the user is located from among the predefined spaces based on the information regarding the strength of the first signal and the information regarding the strength of the second signal received from each of the plurality of external devices.

7. The electronic apparatus as claimed in claim 1, wherein the control information comprises information regarding the resolution of the content and information regarding the brightness of the content, and
wherein the information regarding the resolution of the content is based on information regarding an optimal viewing distance according to a size and a resolution of the display.

8. The electronic apparatus as claimed in claim 7, wherein the processor is configured to:

receive operation information regarding a movement of the user from a remote control device for controlling a user terminal or the electronic apparatus through a communication circuit, the movement being determined by one of a gyroscope, an inertia sensor, an accelerometer and a motion sensor; and control at least one of the resolution or the brightness of the content based on control information corresponding to the identified space or the operation information.

9. The electronic apparatus as claimed in claim 1, wherein the predefined spaces are defined based on information regarding a location of the user received for a predetermined time period or more from a user terminal of the user.

10. The electronic apparatus as claimed in claim 1, wherein the processor is configured to, based on identifying that the space in which the user is located is maintained in the identified space for a predetermined time period, control the display to change the at least one of the resolution or the brightness of content displayed through the display.

11. The electronic apparatus of claim 1, wherein the three or more predefined spaces are defined based on map information partitioning spaces.

12. A method controlling of an electronic apparatus, the method comprising:

obtaining distance information regarding a distance between a user of the electronic apparatus and the electronic apparatus at a first location;

identifying a space in which the user is located from among three or more predefined spaces at the first location according to a distance from the electronic apparatus based on the distance information; and controlling at least one of a resolution or a brightness of content displayed through a display of the electronic apparatus based on control information corresponding to the identified space from among predetermined control information for each of the predefined spaces at the first location.

13. The method as claimed in claim 12, further comprising:

obtaining first distance information regarding a distance between the user of the electronic apparatus and the electronic apparatus through a sensor of the electronic apparatus;

receiving a first signal from a user terminal of the user connected to the electronic apparatus; and obtaining second distance information regarding a distance between the user and the electronic apparatus based on a strength of the received first signal, wherein the identifying the space in which the user is located comprises identifying the space in which the user is located from among the predefined spaces based on the first distance information and the second distance information.

14. The method as claimed in claim 13, further comprising:

receiving a user voice of the user through a microphone of the electronic apparatus; and obtaining third distance information regarding a distance between the user and the electronic apparatus based on a size of the received user voice, wherein the identifying the space in which the user is located comprises identifying a space in which the user is located from predefined spaces based on the first distance information, the second distance information and the third distance information.

15. The method as claimed in claim 14, further comprising:

obtaining an image regarding a front of the electronic apparatus through a camera of the electronic apparatus; and obtaining fourth distance information regarding a distance between the user and the electronic apparatus based on whether an object corresponding to the user is included in the obtained image and a size of the object corresponding to the user, wherein the identifying the space in which the user is located comprises identifying the space in which the user is located from among of the predefined spaces based on the first distance information, the second distance information, the third distance information, and the fourth distance information.

16. The method as claimed in claim 15, further comprising:

obtaining illuminance information regarding a surrounding of the electronic apparatus through an illuminance sensor of the electronic apparatus; and obtaining fifth distance information regarding a distance between the user and the electronic apparatus based on the illuminance information, wherein the identifying the space in which the user is located comprises identifying the space in which the user is located from among the predefined spaces based on the first distance information, the second distance information, the third distance information, the fourth distance information, and the fifth distance information.

* * * * *